(12) United States Patent
Villani et al.

(10) Patent No.: US 6,319,345 B1
(45) Date of Patent: Nov. 20, 2001

(54) HIGH-TRANSVERSE-CURVATURE TIRE

(75) Inventors: Claudio Villani; Alessandro Volpi, both of Milan (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 09/366,730

(22) Filed: Aug. 4, 1999

Related U.S. Application Data

(62) Division of application No. 08/577,129, filed on Dec. 22, 1995, now Pat. No. 5,988,246.

(30) Foreign Application Priority Data

Dec. 22, 1994 (IT) .............................................. MI94A2605

(51) Int. Cl.[7] .................................................. B29D 30/70
(52) U.S. Cl. ........................... 156/117; 156/123; 156/130
(58) Field of Search .................................. 156/117, 397, 156/123, 130, 126, 133; 152/531, 532, 533, 536, 537, 527, 458, 530

(56) References Cited

U.S. PATENT DOCUMENTS

| | | | |
|---|---|---|---|
| 4,949,770 | * 8/1990 | Polvara et al. | 152/531 |
| 5,052,458 | * 10/1991 | Bajer | 152/532 |
| 5,176,770 | * 1/1993 | Ohkuni | 156/117 |
| 5,339,878 | * 8/1994 | Takase | 152/531 |
| 5,467,807 | * 11/1995 | Neddenriep et al. | 152/532 |
| 5,562,792 | * 10/1996 | Caretta | 156/117 |

FOREIGN PATENT DOCUMENTS

| | | |
|---|---|---|
| 0320705 | 6/1989 | (EP) . |
| 0329589 | 8/1989 | (EP) . |
| 0433974 | 6/1991 | (EP) . |
| 0461646 | 12/1991 | (EP) . |

\* cited by examiner

*Primary Examiner*—Geoffrey L. Knable
(74) *Attorney, Agent, or Firm*—Finnegan, Henderson, Farabow, Garrett & Dunner, L.L.P.

(57) ABSTRACT

In a tire for motor-vehicles, an auxiliary support element (9) is interposed between a carcass ply (3) and a belt structure (6). The support element is employed during the manufacturing step of the belt structure (6) in order to stably retain, on the sectors of a comb drum (10), coils (7a) consecutively formed by winding of an inextensible cord (7) therearound. The auxiliary support element (9) is made in the form of an elastomeric sheet containing short aramid fibers in an amount included between 1 and 10 parts by weight per 100 parts of elastomeric material, to increase the stretchability of said element without impairing its adhesiveness. The introduction of the short aramid fibers in the blend enables the thickness of the auxiliary support element (9) to be reduced to about 0.075 mm.

4 Claims, 2 Drawing Sheets

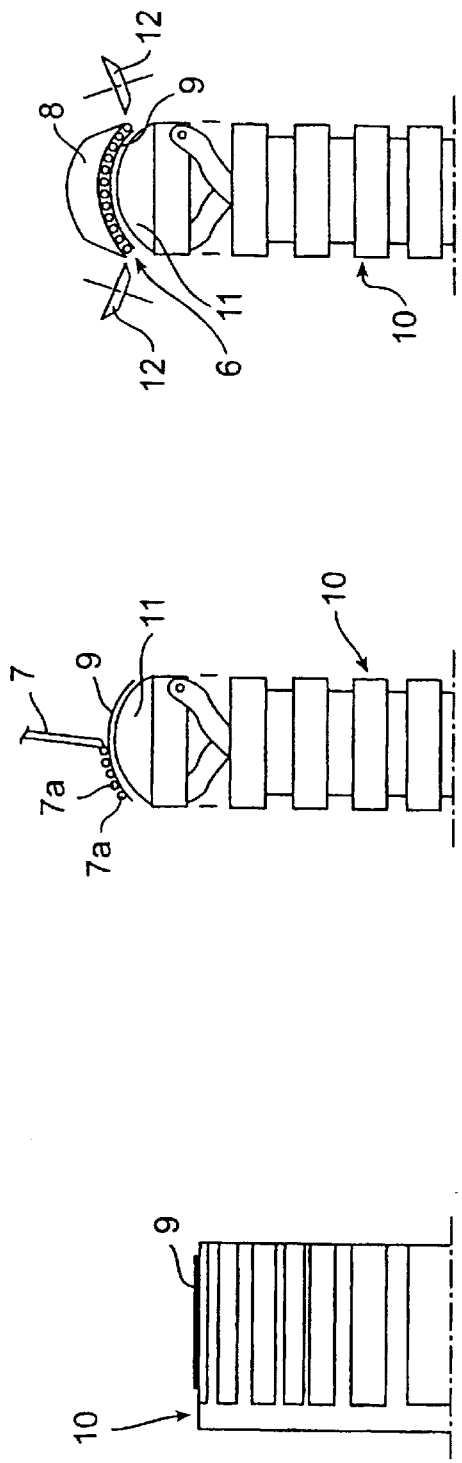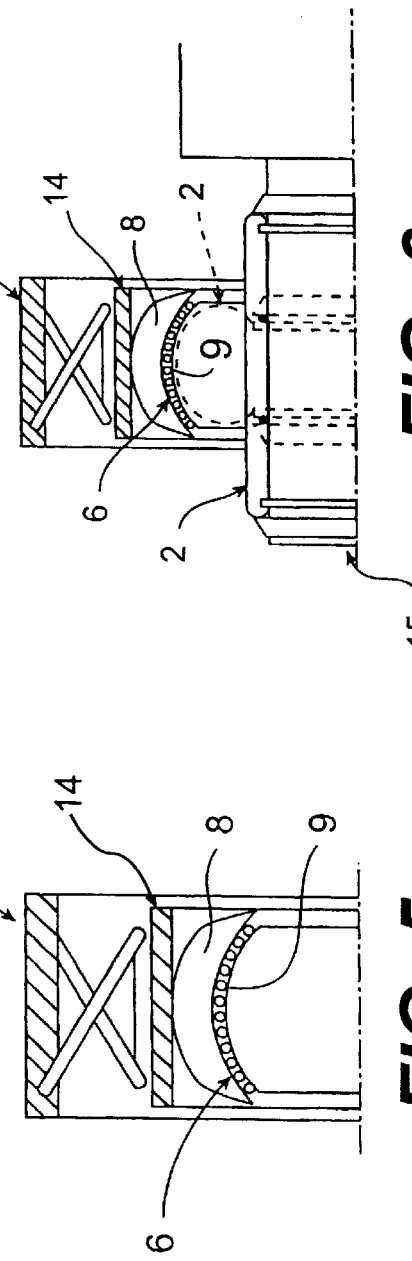

HIGH-TRANSVERSE-CURVATURE TIRE

The present application is a divisional of U.S. patent application Ser. No. 08/577,129, filed Dec. 22, 1995 now U.S. Pat No. 5,988,246, incorporated herein by reference.

BACKGROUND OF THE INVENTION

The present invention relates to a high-transverse-curvature tire, in particular for motor-vehicle wheels, comprising: a carcass structure consisting of at least one carcass ply having its circumferential end edges turned back around two bead cores; a belt structure extending circumferentially about the carcass ply and having at least one circumferentially inextensible cord wound in a plurality of circumferential coils disposed side by side to define at least one layer of a curvilinear transverse profile; a tread band applied circumferentially to the belt structure; said inextensible cord being wound on an auxiliary support element made in the form of an elastomeric sheet, interposed between the belt structure and carcass ply and shaped according to the transverse-curvature profile of the layer formed by said coils.

While being conceived in particular with reference to the manufacture of tires for high-performance motorcycles, the novel principles suggested by the present invention can be adopted to advantage in the manufacture of any type of tire in which the belt structure is made separately from the carcass structure and subsequently assembled, and in any case in the manufacture of any composite article in which provision is made for one or more steps requiring the use of auxiliary elements in the form of an elastomeric sheet for supporting and/or structurally stabilizing other components during manufacture.

It is known that during the manufacture of tires for motor-vehicles, or in any event tires characterized by a high transverse curvature, the belt structure is made on a so-called "comb drum", to be subsequently picked up, after application of the tread band, by a transfer ring bringing it into engagement with a carcass structure previously made on a building drum.

In greater detail, according to the traditional tire manufacturing method, for making the belt structure one or more belt strips are wound in mutual overlapping relation around the comb drum so that, when winding has been completed, said belt strips are substantially shaped as a cylindrical sleeve. At this point, upon intervention of a plurality of radially expansible sectors provided in the comb drum the belt structure acquires a curvilinear transverse profile substantially coinciding with the transverse profile that the finished tire will have.

The thus shaped belt structure is ready to be picked up from the comb drum and be coupled with the carcass structure, after application of the tread band.

One example of the above described state of the art in given in the Italian Patent Application No. 22730A/89 in the name of the same assignee, the disclosure of which is hereby incorporated by reference.

Recently, referring primarily to high-performance tires for motorcycles, belt structures which have become increasingly more used essentially consist of a single cord or a plurality of cords disposed parallelly in side by side relation to form a ribbon-like or tape structure which is directly wound on the comb drum in a plurality of circumferential parallel side by side coils substantially oriented in the rolling direction of the tire. Such a tire is disclosed for example in the Italian Patent Application No. 20646A/90 in the name of the same assignee, the disclosure of which is hereby incorporated by reference.

In this solution it is necessary that the winding operation be executed with the expansible sectors of the comb drum already radially expanded from the drum itself. In fact, since the cord used is of the inextensible type, it would be impossible to carry out the radial expansion of the sectors, if the cord had been previously wound on the comb drum in a cylindrical configuration.

However, the individual coils could encounter problems in terms of stability during winding, due to the fact that the sectors on which said cord is to be wound have a curved profile. It is therefore necessary that before the winding operation, an auxiliary support element of raw elastomeric material be laid down on the comb drum. This auxiliary element, by virtue of its adhesiveness, is capable of ensuring the geometrical and structural stability of the coil layer being progressively formed during the cord winding.

This auxiliary support element, made in the form of a sheet obtained through usual drawing and/or calendering steps, is wrapped in the form of a cylindrical sleeve around the comb drum having its sectors retracted, to be then expanded and shaped according to the the radially external profile of the expansible sectors, following the radial expansion of these latter before the beginning of the cord winding.

The fundamental properties of this support element are therefore stretchability and adhesiveness so that the element will be bound not only to the cord that is going to be wound, but also. during the tire manufacture, to the adjacent elements.

For this purpose, the use of natural rubber possessing both a good adhesiveness and a good stretchability in a raw state is therefore preferred, the bond between said support element and the adjacent elements is further promoted by the fact that also the rubberizing blends for the carcass plies and the belt strips are mainly natural-rubber-based blends.

On the other hand, this auxiliary support element does not perform any structural function, its only aim being that of stabilizing the coils formed by the cord while the belt structure is being made, so that its presence in the finished tire is not essential. It would be therefore desirable for the elastomeric sheet forming said support element to have weight and thickness as much as possible reduced in order to minimize the effects of its presence in the finished tire, in particular for the purpose of restraining the centrifugal forces induced by said support element and reducing the resistance to rolling of the tire during the running.

Furthermore, natural rubber and also other known blends, while having sufficient stretchability as a whole, are not amenable to a thickness reduction of less than 0.5 mm, due to the insufficient mechanical strength at high localized stretching variations, like those generated during the radial expansion of the curved sectors of the comb drum.

One could think about increasing this strength by means of appropriate reinforcing fillers; however known methods of imparting good mechanical strength features to an unvulcanized elastomeric material, based on the use either of previously cross-linked or crystalline polymers, or textile or mineral fibers, did not give satisfactory results: in fact they had several disadvantages, in particular a strong adhesiveness reduction often without increasing or even decreasing stretchability.

There are also other reasons preventing the sizes of said auxiliary element from being reduced under the above mentioned value: in fact, with presently used traditional blends and with usual machines, practical problems arise that virtually do not enable sheet thicknesses lower than 0.5 mm to be achieved. The following drawbacks should be noted in particular: the material has a tendency to adhere to the machine components (the calender cylinders, for example) so that it tears on separation; the sheet thickness does not keep constant but it increases on its coming out of the machine and in addition said thickness varies in an uneven manner, transversely of the feed direction of the sheet; and it is very difficult (sometimes even impossible) to collect the sheet and convey it to the subsequent use stations without causing pleats and, as a result, strong localized variations in thickness.

In accordance with the present invention, it has been found that making the auxiliary support element of an elastomeric material filled with appropriate bonding means, preferably consisting of short fibrillose fibers of poly-para-phenylene terephthalamide (usually defined as aramid pulp) commercially known as Kevlar* Pulp or Twaron** Pulp (*registered trademark of Du Pont; ** registered trademark of Akzo) in an amount between 1 and 10 phr (parts by weight per 100 parts of rubber), a surprising increase in the structural strength of the elastomeric sheet is achieved along with high adhesiveness and constancy in the imposed size values, so that it is possible to achieve greatly lower thicknesses as compared with those of the known art. The sheet thus produced is capable of bearing without damages the stresses it undergoes during the sheet preparation process, that is its winding and unwinding around and from the collecting rolls, its separation from the support means (usually polythene or other service material), its laying onto the comb drum and the subsequent stretching, by expansion of the curved sectors.

In a further aspect the invention relates to a tire of high transverse curvature, in particular for motor-vehicle wheels, characterized in that said auxiliary support element comprises fibrillose short fibers homogeneously distributed in the elastomeric material so as to increase the stretchability features of said sheet without substantially altering the adhesiveness features of said elastomeric material in the raw state.

Preferentially, said fibrillose short fibers comprise short fibers of poly-para-phenylene terephthalamide, inserted in the elastomeric material forming said sheet in an amount between 1 and 10 phr and having a length between 0.1 mm and 2.5 mm.

Advantageously, said sheet of elastomeric material has a thickness between 0.075 and 0.5 mm.

Preferably, said fibrillose short fibers are pre-oriented (by a calendering operation for example) in the major direction of the forces to which the support element is submitted during the tire manufacture process. Normally this direction is the circumferential direction of the tire and said pre-orienting operation is preferentially carried out by calendering of said sheet during the manufacture process of same.

The elastomeric material reinforced with said aramid, in the raw state has a tensile strength included between 3 and 7 MPa and a 50% elongation under a traction load between 0.2 and 0.5 MPa.

Preferentially the material forming said auxiliary support element is a natural rubber-based blend containing carbon black in an amount between 30 and 70 phr, filled with usual ingredients known in the art (plasticizers, protection agents, degradation-resistant and vulcanizing agents) so as to obtain an elastomeric matrix as much as possible similar to that of the elements to which said sheet must adhere.

The invention also relates to a process for manufacturing said tire, and the auxiliary support element as such, to be generally used for structural stabilization of constructional components in a composite manufactured article, in the intermediate manufacturing steps of same.

Further features and advantages will become more apparent from the detailed description of a preferred embodiment of a high- transverse-curvature tire in particular for motor-vehicles, in accordance with the present invention. This description will be given hereinafter, by way of non-limiting example, with reference to the accompanying drawings, in which:

BRIEF DESCRIPTION OF THE DRAWINGS

FIGS. 2 to 6 diagrammatically show steps of the manufacturing process of the tire of the invention.

DETAILED DESCRIPTION OF A PREFERRED EMBODIMENT

Figure 1:
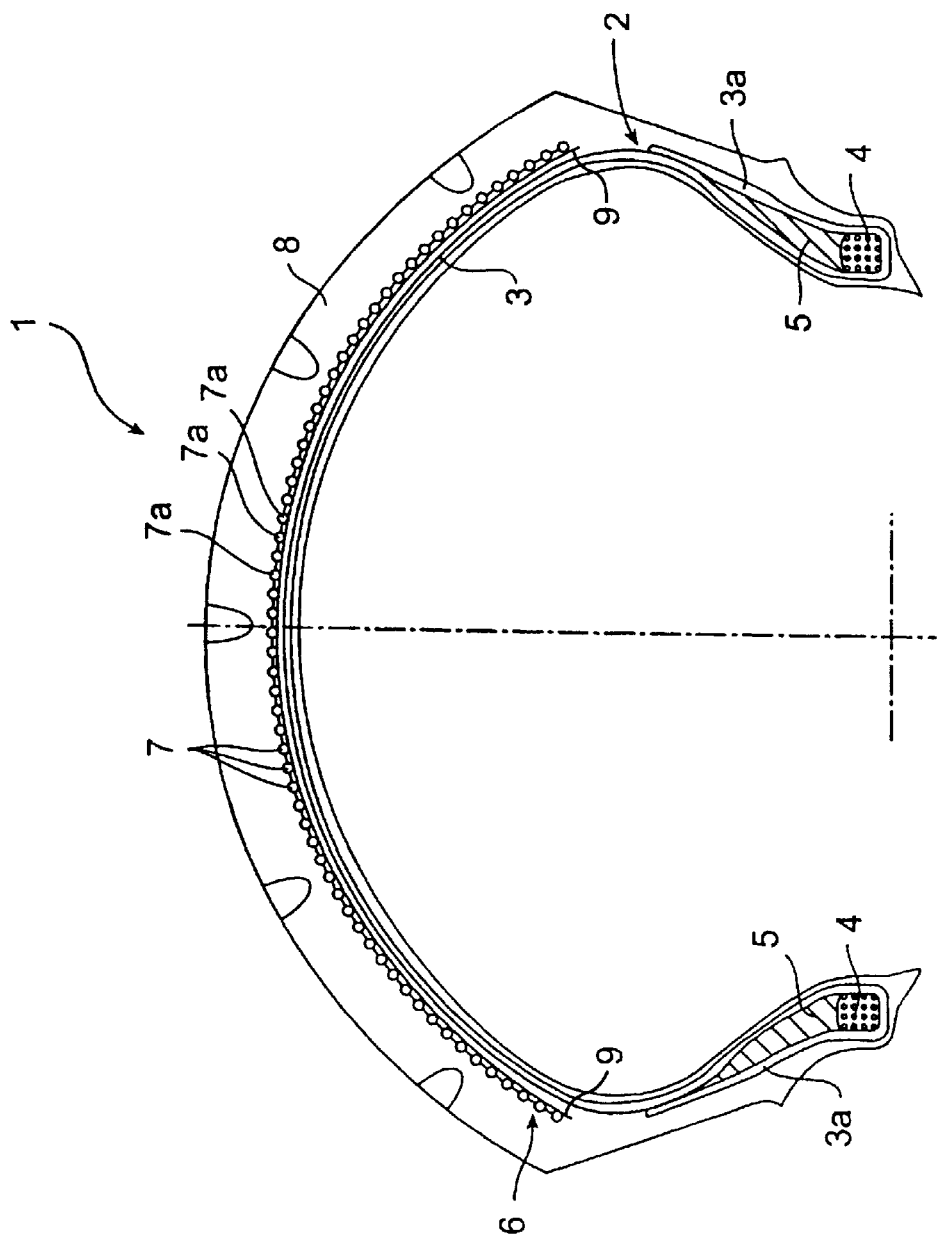
FIG. 1 is a cross-sectional profile of a tire made in accordance with the present invention.

Referring to the drawings, a high-transverse-curvature tire in particular for motor-vehicles in accordance with the present invention has been generally identified by reference numeral 1.

Tire 1 has a carcass structure 2 comprising at least one carcass ply 3 the opposite side edges 3a of which are turned back around corresponding bead cores 4.

An elastomeric filler is applied to the external peripheral edge of the bead cores 4 and it occupies the space defined between the carcass ply 3 and the corresponding turned back side edge 3a.

Associated with the carcass structure 2 is a belt structure 6 essentially consisting of at least one inextensible cord 7 extending in a crown configuration circumferentially of the carcass ply 3 to form a plurality of parallel coils 7a disposed consecutively in side by side relation and substantially oriented in the rolling direction of the tire 1.

The coils 7a disposed consecutively side by side to form a curvilinear profile, by virtue of their longitudinal inextensibility cause a structural and dimensional stabilization of the tire 1 according to the desired transverse-curvature profile.

In known manner, a tread band 8 is applied to the belt structure 6, said tread being the ground-contacting area of the tire.

As shown in FIG. 1, coils 7a formed of the inextensible cord 7 are wound on an auxiliary support element 9 substantially consisting of an elastomeric sheet interposed between the belt structure 6 and carcass ply 3 and shaped like the transverse-curvature profile of the layer formed by the coils themselves.

Referring particularly to FIGS. 2 to 6 diagrammatically showing some of the main manufacturing steps of the tire, laying of the auxiliary support element 9 onto a usual comb drum 10 is first carried out, as shown in FIG. 2, so as to make the belt structure and give it a cylindrical conformation.

Subsequently, as shown in FIG. 3, the extension of a plurality of radially expansible curved sectors 11 usually associated with the comb drum 10 is caused, the shape of said sectors conforming to the intended cross-sectional profile of the belt structure 6. In this situation, the auxiliary support element 9 is forced to expand and undergoes a plastic stretching so that it takes the shape of the external profile of the expansible sectors 11. Then winding of the inextensible cord 7 in a plurality of coils 7a disposed consecutively side by side is carried out, starting from one of the end edges of the auxiliary support element 9 for example, as shown in FIG. 3. During this step, the adhesiveness of the raw elastomeric material forming the auxiliary support element ensures a stable positioning of the individual coils 7a formed on the expansible sectors 11, without any risk that the coils will undesirably slip along the external profile of said sectors.

When winding is over, with the optional aid of presser rollers 12 (FIG. 4), the application of the tread band 8 to the belt structure 6 formed on the expansible sectors 11 of the comb drum 10 is carried out.

In a known manner the belt structure 6, together with the tread band 8 to which said belt is applied, is taken up by a transfer ring 13 provided with appropriate grasping means 14 and is coaxially fitted onto the carcass structure 2 previously formed on a building drum 15 associated with said manufacturing machine. The carcass ply first arranged in the form of a cylindrical sleeve is radially expanded by axially moving the bead cores 4 close to each other upon command of the building drum 15 and optionally admitting air, preferably pressurized air, to the inside of said sleeve, in order to obtain fitting of same to the radially inner surface of the belt structure 6, and more particularly, the auxiliary support element 9.

The manufactured tire 1 will be then taken up from the building drum 15 to be submitted to the final vulcanization process.

In the light of the above, it will be recognized that the auxiliary support element 9 quite conveniently retains the coils 7a formed by the cord 7 to give the belt 6 a sufficient structural stability while it is being made and in the subsequent handling steps preceding mounting of same to the carcass structure 2. Further advantages to the operating features of the vulcanized tire appear to be obtained with the presence of the auxiliary element 9, even if, at the moment, they are not completely cleared up. Anyway, the auxiliary support element 9 should be made as thin as possible in order to conveniently restrain its bulkiness and weight, taking into account the fact that the weight of said support element is of great importance in connection with the generation of centrifugal forces since it is located in the tire areas of maximum radius.

In accordance with the present invention, in order to enable the manufacture and use of auxiliary support elements 9 of much lower thickness than thicknesses permitted in the known art, it has been envisaged that the elastomeric material forming the auxiliary element should contain the so-called aramid pulp (fibrillose short fibers of poly-para-phenylene terephthalamide) homogeneously dispersed therein, of the type commercially known as "Kevlar-pulp" or "Twaron-pulp" (Kevlar and Twaron are registered trademarks of Du Pont and Akzo, respectively) or equivalent bonding means, adapted to increase the mechanical strength and stretchability features of the elastomeric material in the raw state, without substantially altering the adhesiveness features of same.

It has been found in fact that in the presence of aramid fibers dispersed in the elastomeric material blend forming said auxiliary support element 9, the latter can be made in the form of a very thin sheet, without undergoing any tearing as a result of the plastic deformations induced therein by effect of the extraction of the expansible sectors 11 from the comb drum, and upon the action of the tangential stresses transmitted during laying of the inextensible cord 7.

In greater detail, it has been found that the best results are achieved by introducing the aramid pulp into the raw elastomer blend in an amount included between 1 and 10 phr (parts by weight per 100 parts of rubber) and using fibers of a length included between 0.1 and 2.5 mm.

Practically, by adopting the innovatory solutions proposed by the invention, it is possible to make and use in the tire manufacture, an auxiliary support element 9 of a thickness between 0.075 and 0.5 mm, preferably in the range of 0.25 mm or less, so that its weight is less than halved as compared with the weight of the auxiliary elements made according to the known art.

The resistance to the stretching actions induced by extension of the expansible sectors 11 can be further increased if the auxiliary element 9 is made by calendering, so that the aramid fibers are pre-oriented in a preferred direction in the elastomer sheet forming the auxiliary element itself; this preferred direction usually is (at least for use in the described tire) the circumferential direction of the tire coinciding with the longitudinal direction of the sheet emerging from the calender.

By way of example, in the following table the compositions of six different blends are reproduced, namely a traditional blend (A) for the specified use, two blends (B, C) reinforced according to the solutions of the known art and three blends (D, E, F) according to the invention.

In particular, blend B was reinforced by means of a crystalline polymer named transpolyoctenamer, best known as "Vestenamer 8612" available from HÜLS, whereas blend C was reinforced by means of a previously cross-linked polymer, commercially known as SBR4503 available from AMERIPOL SYNPOL Corp.

For all cited blends, tensile strength (in MPa) and adhesiveness (evaluated according to a scale from 0 to 10) are shown, these values being measured on the unvulcanized blend.

It is possible to see that in the blends according to the invention, due to the addition of aramid fibers with a distribution of lengths between 0.2 and 0.8 mm in an amount included between 1 and 5 phr, a tensile strength varying between 3 and 5 MPa was obtained, with a 50% elongation under traction loads included between 0.6 and 2.5 MPa respectively, while maintaining the adhesiveness value of the traditional blend substantially unaltered.

In the same elastomer, devoid of aramid fibers, the tensile strength corresponds to 1.6 MPa, whereas an elongation of 50% is caused by a traction load of 0.3 MPa.

On the contrary, in blends reinforced in the usual manner the tensile strength values are comparable with those of the blends of the invention, but the adhesiveness value shows completely unacceptable values, that is of the order of 50%.

TABLE

| | A | B | C | D | E | F |
|---|---|---|---|---|---|---|
| INGREDIENTS/ BLENDS | | | | | | |
| Natural rubber | 100 | 70 | 70 | 100 | 100 | 100 |
| Carbon black | 55 | 55 | 55 | 55 | 55 | 55 |
| Vestenamer 8612 | = | 30 | = | = | = | = |
| SBR 4503 | = | = | 30 | = | = | = |
| Aramid pulp | = | = | = | 1 | 3.5 | 5 |
| Zinc oxide | 5 | 5 | 5 | 5 | 5 | 5 |
| Protective system | 2 | 2 | 2 | 2 | 2 | 2 |
| Vulcanizing system | 5 | 5 | 5 | 5 | 5 | 5 |

TABLE-continued

|  | A | B | C | D | E | F |
|---|---|---|---|---|---|---|
| PROPERTIES/ BLENDS | | | | | | |
| 50% Elongation modulus | 0.3 | 1.5 | 1 | 0.6 | 1.5 | 2.5 |
| Tensile strength | 1.6 | 5.5 | 4.8 | 3 | 4.5 | 5 |
| Adhesivity | 9 | 4 | 5 | 9 | 8 | 8 |

Obviously the stated values can be varied within some limits depending on the type of elastomer and blend used, and also depending on the amount and typology of the aramid fibers used.

For the purposes of the present invention, it is however preferable that the tensile strength be between 3 and 7 MPa and that a 50% elongation should be caused by a load between 0.6 and 3 mPa.

It is pointed out that the novel principles proposed by the present invention can be adopted to advantage for making any type of auxiliary reinforcing element to be used for purposes different from the described one. In greater detail, said novel principles can be conveniently employed in all cases in which a so-called service semi-finished product is to be introduced into the structure of a manufactured article of elastomeric material, which semi-finished product does not directly affect the operating behavior of the finished product but only performs support functions in the manufacturing process of the finished product. For example, the introduction of bonding means such as aramid fibers can be adopted in making "junction-covering straps", that is straps used to joint two portions of rubberized cloth end to end in order to prevent opening of the junction when the semi-finished product is being handled during the manufacturing steps.

It is apparent that the possibility of reducing the thickness of these service semi-finished products is very advantageous because the presence of these elements in the finished product is not of practical utility but, on the contrary, is a source of structural unevenness the importance of which increases with the increasing of the thickness of said semi-finished product.

The present invention is believed to produce its beneficial effects with all the types of inextensible cords (textile such as those of aramid or metallic such as those of the regular lay type) usually adopted for the construction of the belt structure in tires for vehicle wheels. Particularly the present invention has been shown to produce results of specific relevance when adopted in tires for two-wheeled vehicles. More specifically, the present invention showed very good results (as shown by a series of road tests made by the Assignee) when adopted in combination with the very well known High Elongation type metallic cords described in more details in the above cited Italian patent application No. 20646A/90, to which one may refer for further exhaustive information, both in respect of the cord itself and of the tire structure.

Said cords have a typical behavior under load, characterized by a load-elongation diagram having a curvilinear portion (whose center line usually ranges between an elongation value of 1.5 to 3%) which mutually connects two substantially rectilinear lengths of different slope relative to the axes of said diagram, such that the cord is initially more elongated at low loads.

The above cited results denote that the auxiliary element 9 according to the invention has also a great influence on the operating characteristics of the tire in use, particularly as far as regards the problem of slip thrust resisted by the tire when subjected to drift with consequent not negligible increase of its performance level, mainly in terms of speed and stability at high speed.

Once the skilled in the art understands the invention, as described hereabove, he will be able to make those selections, variations and modifications to the variables which are associated with the invention to meet his specific technical needs.

What is claimed is:

1. A process for the manufacture of a high-transverse-curvature tire comprising the steps of:

previously manufacturing a carcass structure comprising at least one carcass ply having edges which are turned back around two bead cores;

arranging an auxiliary support element on a comb drum, wherein the auxiliary support element is made in a form of a sheet of elastomeric material wound around the comb drum;

shaping the auxiliary support element so as to give the auxiliary support element a curvilinear transverse profile, through radial expansion of a plurality of radially movable sectors associated with the comb drum;

circumferentially winding around the auxiliary support element at least one inextensible cord forming a plurality of circumferential coils disposed consecutively side-by-side to define a belt structure of a curvilinear transverse profile;

circumferentially applying a tread band to the belt structure; and applying the belt structure together with the tread band to a circumference of the previously manufactured carcass structure, the elastomeric material forming the auxiliary support element having a blend of bonding means provided in order to increase stretchability of the elastomeric material without substantially altering adhesiveness thereof;

wherein the bonding means comprises aramid pulp.

2. The process of claim 1, wherein the aramid pulp is introduced into the elastomeric material in an amount between 1 and 10 phr.

3. The process of claim 2, in which fibers in the aramid pulp have a length between 0.1 mm and 2.5 mm.

4. The process of claim 1, in which the auxiliary support element is formed through a calendaring step for pre-orienting fibers in the aramid pulp in a preferred direction in the elastomeric material.

* * * * *